(12) United States Patent
Lin et al.

(10) Patent No.: US 12,526,558 B2
(45) Date of Patent: Jan. 13, 2026

(54) DATA TRANSMISSION METHOD AND RELATED DEVICE

(71) Applicant: Huawei Technologies Co., Ltd., Shenzhen (CN)

(72) Inventors: Liankui Lin, Dongguan (CN); Lun Zhang, Dongguan (CN); Jun Luo, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 235 days.

(21) Appl. No.: 18/320,848

(22) Filed: May 19, 2023

(65) Prior Publication Data

US 2023/0300500 A1  Sep. 21, 2023

Related U.S. Application Data

(63) Continuation of application No. PCT/CN2021/130796, filed on Nov. 16, 2021.

(30) Foreign Application Priority Data

Nov. 20, 2020 (CN) .......................... 202011313875.9

(51) Int. Cl.
*H04Q 11/00* (2006.01)
(52) U.S. Cl.
CPC . *H04Q 11/0067* (2013.01); *H04Q 2011/0064* (2013.01)
(58) Field of Classification Search
CPC .................................................. H04Q 11/0067
See application file for complete search history.

(56) References Cited

U.S. PATENT DOCUMENTS

| 7,408,955 | B2 | 8/2008 | Choi et al. |
| 8,340,518 | B2 | 12/2012 | Yoshida et al. |
| 11,563,673 | B1* | 1/2023 | Smith ..................... H04L 45/22 |
| 2002/0030875 | A1 | 3/2002 | Kim et al. |
| 2010/0310252 | A1* | 12/2010 | Healey ................... H04J 3/1694 398/6 |
| 2012/0008948 | A1* | 1/2012 | Kazawa ............. H04Q 11/0067 398/58 |
| 2012/0321315 | A1 | 12/2012 | Timm et al. |
| 2017/0237489 | A1* | 8/2017 | Zhang ................. H04L 27/2666 398/36 |

(Continued)

FOREIGN PATENT DOCUMENTS

| CN | 1417982 A | 5/2003 |
| CN | 1420652 A | 5/2003 |

(Continued)

*Primary Examiner* — Shi K Li
(74) *Attorney, Agent, or Firm* — Slater Matsil, LLP

(57) ABSTRACT

A data transmission method and a related device. The method includes an OLT obtains a first uplink transmission parameter of a first terminal corresponding to a first ONU. Then the OLT determines, based on the first uplink transmission parameter, a cycle period for performing data transmission with the first ONU, where each cycle period includes an uplink time window and a downlink time window, the uplink time window includes a first uplink transmission timeslot used by the first ONU to send uplink data, and the downlink time window is used by the OLT to send downlink data. Then the OLT sends an uplink grant message to the first ONU.

20 Claims, 9 Drawing Sheets

(56) References Cited

U.S. PATENT DOCUMENTS

2022/0417914 A1\* 12/2022 Uzawa ................ H04W 72/044

FOREIGN PATENT DOCUMENTS

| CN | 1635739 A | 7/2005 |
| --- | --- | --- |
| CN | 101742368 A | 6/2010 |
| CN | 101984777 A | 3/2011 |
| CN | 103596071 A | 2/2014 |
| CN | 108809851 A | 11/2018 |
| CN | 112584262 A | 3/2021 |
| WO | 2014201605 A1 | 12/2014 |

\* cited by examiner

| Ethernet frame header | Downlink data of terminal 1 | Uplink data of terminal 1 | ... | Downlink data of terminal N | Uplink data of terminal N | Frame check sequence |

FIG. 6

DATA TRANSMISSION METHOD AND RELATED DEVICE

CROSS-REFERENCE TO RELATED APPLICATIONS

This application is a continuation of International Application No. PCT/CN2021/130796, filed on Nov. 16, 2021, which claims priority to Chinese Patent Application No. 202011313875.9, filed with the China National Intellectual Property Administration on Nov. 20, 2020. The disclosures of the aforementioned applications are hereby incorporated by reference in their entireties.

TECHNICAL FIELD

This application relates to the communications field, and in particular, to a data transmission method and a related device.

BACKGROUND

An industrial field bus is an industrial data bus developed rapidly in recent years. The industrial field bus mainly resolves problems of digital communication between field devices such as an intelligent instrument and meter, a first controller, and an actuator, and information transmission between these field devices and an advanced control system.

In a current field bus protocol, a master station sends a packet, and the packet passes through all slave stations sequentially. Each slave station extracts its data from the packet, and inserts data to be exchanged into the packet. After the packet is transmitted to a last slave station, the packet may be returned to the master station by using a full-duplex feature of an Ethernet technology. However, if a quantity of slave stations is excessively large, using this serial transmission mode causes a relatively long transmission delay.

SUMMARY

This application provides a data transmission method and a related device to replace original serial transmission with parallel transmission, thereby reducing a transmission delay.

According to a first aspect, this application provides a data transmission method. The method is specifically performed by an OLT. First, the OLT obtains a first uplink transmission parameter of a first terminal corresponding to a first ONU, where the first uplink transmission parameter includes an amount of data to be sent by the first terminal each time and a period for sending data by the first terminal. Then the OLT determines, based on the first uplink transmission parameter, a cycle period for performing data transmission with the first ONU, where each cycle period includes an uplink time window and a downlink time window, the uplink time window includes a first uplink transmission timeslot used by the first ONU to send uplink data, and the downlink time window is used by the OLT to send downlink data. Then the OLT sends an uplink grant message to the first ONU, where the uplink grant message is used to indicate the first uplink transmission timeslot of the first ONU in each cycle period. Further, the OLT receives, in a first uplink transmission timeslot in a same cycle period, first uplink data sent by the first ONU, and sends first downlink data to the first ONU in a downlink time window in the same cycle period.

In this implementation, the OLT determines the cycle period based on the uplink transmission parameter of the terminal corresponding to the ONU, and data transmission between the OLT and the ONU is repeatedly performed in the cycle period. The ONU may know the uplink transmission timeslot of the ONU in each cycle period based on the uplink grant message sent by the OLT, and the OLT does not need to send a bandwidth map (BWmap) to the ONU each time to notify the ONU of the uplink transmission timeslot. Therefore, overheads for sending the BWmap each time are reduced.

In some possible implementations, the method further includes: the OLT obtains a second uplink transmission parameter of a second terminal corresponding to a second ONU, where the second uplink transmission parameter includes an amount of data to be sent by the second terminal each time and a period for sending data by the second terminal.

That the OLT determines, based on the first uplink transmission parameter, a cycle period for performing data transmission with the first ONU includes: the OLT determines, based on the first uplink transmission parameter and the second uplink transmission parameter, a cycle period for performing data transmission with the first ONU and the second ONU, where the uplink time window further includes a second uplink transmission timeslot used by the second ONU to send uplink data.

The method further includes: the OLT sends an uplink grant message to the second ONU, where the uplink grant message is further used to indicate the second uplink transmission timeslot of the second ONU in each cycle period; and the OLT receives, in a second uplink transmission timeslot in the same cycle period, second uplink data sent by the second ONU, and sends second downlink data to the second ONU in the downlink time window in the same cycle period.

In this implementation, the OLT sends downlink data to a plurality of ONUs in broadcast mode, and the OLT allocates different uplink transmission timeslots to the ONUs. A PON system provided in this application may be applied to an industrial bus, and original serial transmission is replaced with parallel transmission, so that a transmission delay is reduced.

In some possible implementations, the uplink time window in each cycle period is located before the downlink time window. In this implementation, the ONU may actively send uplink data to the OLT, without strictly complying with a master/slave mode in which downlink transmission is performed first and then uplink transmission is performed, provided that uplink transmission and downlink transmission between the OLT and the ONU are performed in the same cycle period, thereby improving overall work efficiency of the system.

In some possible implementations, each cycle period further includes a first time window, the first time window in each cycle period is located between the uplink time window and the downlink time window, and the method further includes: the OLT sends the first uplink data and the second uplink data to a first controller in a first time window in the same cycle period, and receives, in the first time window in the same cycle period, the first downlink data and the second downlink data sent by the first controller, where the first controller is configured to control the first terminal and the second terminal, the first uplink data comes from the first terminal, and the second uplink data comes from the second terminal.

In this implementation, the controller delivers the corresponding downlink data based on the uplink data reported by the terminal, and the first time window for processing by the controller is reserved in the cycle period, so that practicability of this solution is improved.

In some possible implementations, that the OLT sends the first uplink data and the second uplink data to a first controller in a first time window in the same cycle period includes: the OLT generates an uplink aggregate data frame, where the aggregate data frame includes the first uplink data and the second uplink data; and the OLT sends the aggregate data frame to the first controller in the first time window in the same cycle period. In this implementation, the OLT may combine the uplink data sent by each ONU into the uplink aggregate data frame, and then report the uplink aggregate data frame to the controller in a unified manner, to implement clock synchronization.

In some possible implementations, that the OLT receives, in the first time window in the same cycle period, the first downlink data and the second downlink data sent by the first controller includes: the OLT receives, in the first time window in the same cycle period, a downlink aggregate data frame sent by the first controller, where the downlink aggregate data frame includes the first downlink data and the second downlink data. In this implementation, the controller may combine the downlink data that needs to be delivered into the downlink aggregate data frame, thereby ensuring consistency of transmission formats in data transmission between the controller and the OLT.

In some possible implementations, the method further includes: the OLT receives, in the same cycle period, third downlink data sent by a second controller, where priorities of the first downlink data and the second downlink data are higher than a priority of the third downlink data; and after the OLT sends the first downlink data to the first ONU in the downlink time window in the same cycle period, and sends the second downlink data to the second ONU in the downlink time window in the same cycle period, the method further includes: the OLT sends the third downlink data to a third ONU in the same cycle period.

In this implementation, the method may be further applied to a scenario in which a plurality of types of services coexist. Priorities of the plurality of types of services are different. Therefore, it needs to be preferentially ensured that a service with a high priority is transmitted first, so that the working mode can be extended to an application scenario with more types of services. In addition, if transmission of data with a low priority cannot be completed in a cycle period due to an excessively large data amount, the data with the low priority may be further sliced, and the transmission is continued in a next cycle period. Therefore, flexibility of the solution is improved.

In some possible implementations, each cycle period further includes a second time window and a third time window, the second time window is used by the first terminal to obtain the first uplink data, the third time window is used by the first ONU to send the first downlink data to the first terminal, and the second time window in each cycle period is located before the third time window.

In this implementation, each ONU may collect uplink data in the second time window and actively report the uplink data. In comparison with an existing serial transmission mode, this saves unnecessary waiting time, and improves work efficiency.

In some possible implementations, that the OLT obtains a first uplink transmission parameter of a first terminal corresponding to a first ONU includes: the OLT receives, by using the first ONU, the first uplink transmission parameter sent by the first terminal; or the OLT receives the first uplink transmission parameter sent by the first controller. In this implementation, there is a master-slave relationship between the controller and the terminal. Before delivery, a file in an XML format is configured for both the controller and the terminal. The file includes information such as the uplink transmission parameter of the terminal, vendor information, and a serial number. The OLT may obtain the first uplink transmission parameter from the terminal or the controller. Therefore, scalability of this solution is improved.

In some possible implementations, the first controller may be a programmable logic controller (PLC). The uplink grant message is a physical layer operations, administration and maintenance (PLOAM) message or an optical network terminal management and control interface (OMCI) message. For example, some fields are reserved in an original structure of the PLOAM message or the OMCI message to indicate an uplink transmission timeslot of each ONU in a cycle period, thereby improving implementability of this solution.

According to a second aspect, this application provides a data transmission method. The method is specifically performed by an ONU. First, the ONU receives an uplink grant message sent by an OLT. Then the ONU determines, based on the uplink grant message, a cycle period for performing data transmission with the OLT and an uplink transmission timeslot in each cycle period, where each cycle period includes an uplink time window and a downlink time window, the uplink time window includes an uplink transmission timeslot used by the ONU to send uplink data, and the downlink time window is used by the OLT to send downlink data. Further, the ONU sends uplink data to the OLT in an uplink transmission timeslot in a same cycle period, and receives, in a downlink time window in the same cycle period, downlink data sent by the OLT.

In some possible implementations, the uplink time window in each cycle period is located before the downlink time window.

In some possible implementations, before the ONU sends the uplink data to the OLT in the uplink transmission timeslot in the same cycle period, the method further includes: the ONU receives, in the same cycle period, the uplink data sent by a terminal.

In some possible implementations, the downlink data is sent by a controller to the OLT, the controller is configured to control the terminal, and after the ONU receives, in the downlink time window in the same cycle period, the downlink data sent by the OLT, the method further includes: the ONU sends the downlink data to the terminal in the same cycle period.

In some possible implementations, before the ONU receives the uplink grant message sent by the OLT, the method further includes: the ONU receives an uplink transmission parameter sent by the terminal, and sends the uplink transmission parameter to the OLT, where the cycle period is determined by the OLT based on the uplink transmission parameter, and the uplink transmission parameter includes an amount of data to be sent by the terminal each time and a period for sending data by the terminal.

According to a third aspect, this application provides an OLT, including a processor, a memory, and an optical transceiver. The processor, the memory, and the optical transceiver are connected to each other by using a bus, and the processor invokes program code in the memory to perform the data transmission method according to any one of the implementations of the first aspect.

According to a fourth aspect, this application provides an ONU, including a processor, a memory, and an optical transceiver. The processor, the memory, and the optical transceiver are connected to each other by using a bus, and the processor invokes program code in the memory to perform the data transmission method according to any one of the implementations of the second aspect.

According to a fifth aspect, this application provides a passive optical network. The passive optical network includes the OLT according to the third aspect and the ONU according to the fourth aspect.

According to a sixth aspect, this application provides a data transmission system, including a controller, an OLT, an ONU, and a terminal.

The OLT is configured to obtain an uplink transmission parameter of the terminal corresponding to the ONU, determine, based on the uplink transmission parameter, a cycle period for performing data transmission with the ONU, and send an uplink grant message to the ONU. Each cycle period includes an uplink time window and a downlink time window, the uplink time window includes an uplink transmission timeslot used by the ONU to send uplink data, the downlink time window is used by the OLT to send downlink data, and the uplink grant message is used to indicate the uplink transmission timeslot of the ONU in each cycle period.

The ONU is configured to receive, in a same cycle period, uplink data sent by the terminal, and send the uplink data to the OLT in the same cycle period.

The OLT is further configured to receive, in the same cycle period, downlink data sent by the controller, and send the downlink data to the ONU in the same cycle period.

The ONU is further configured to send the downlink data to the terminal in the same cycle period.

According to a seventh aspect, this application provides a computer-readable storage medium, where the computer-readable storage medium stores a computer program, and when the computer program is executed by hardware, some or all steps of any method performed by the OLT in the first aspect can be implemented.

According to an eighth aspect, this application provides a computer-readable storage medium, where the computer-readable storage medium stores a computer program, and when the computer program is executed by hardware, some or all steps of any method performed by the ONU in the second aspect can be implemented.

In embodiments of this application, the OLT determines the cycle period based on the uplink transmission parameter of the terminal corresponding to the ONU, and data transmission between the OLT and the ONU is repeatedly performed in the cycle period. The ONU may know the uplink transmission timeslot of the ONU in each cycle period based on the uplink grant message sent by the OLT, and the OLT does not need to send a BWmap to the ONU each time to notify the ONU of the uplink transmission timeslot. Therefore, overheads for sending the BWmap each time are reduced. In addition, the OLT sends downlink data to each ONU in broadcast mode. If the PON system provided in this application is applied to the industrial bus, and original serial transmission is replaced with parallel transmission, the transmission delay is reduced. In addition, the ONU may actively send the uplink data to the OLT, without strictly complying with the master/slave mode in which downlink transmission is performed first and then uplink transmission is performed, provided that uplink transmission and downlink transmission between the OLT and the ONU are performed in the same cycle period, thereby improving overall work efficiency of the system.

BRIEF DESCRIPTION OF THE DRAWINGS

FIG. 6 is a schematic diagram of a structure of an aggregate data frame according to an embodiment of this application;

DETAILED DESCRIPTION OF ILLUSTRATIVE EMBODIMENTS

This application provides a data transmission method and a related device. It should be noted that "first", "second", "third", and the like in the specification, claims, and accompanying drawings of this application are used to distinguish between similar objects, but not intended to describe a specific order or sequence. It should be understood that the foregoing terms may be interchangeable in proper circumstances so that embodiments described in this application can be implemented in other orders than the order described herein. Moreover, the terms "include", "have", or any other variant thereof are intended to cover a non-exclusive inclusion. For example, a process, method, system, product, or device that includes a series of steps or units is unnecessarily limited to the clearly listed steps or units, but may include other steps or units that are not explicitly listed or are inherent to the process, method, product, or device.

An Ethernet for control and automation technology (EtherCAT) is an Ethernet-based field bus system with an open architecture. For communication, automation generally requires a relatively short data update time (or period time), a low communication jitter amount during data synchronization, and low hardware costs. The EtherCAT is developed to allow the Ethernet to be used in an automation application.

Figure 1:
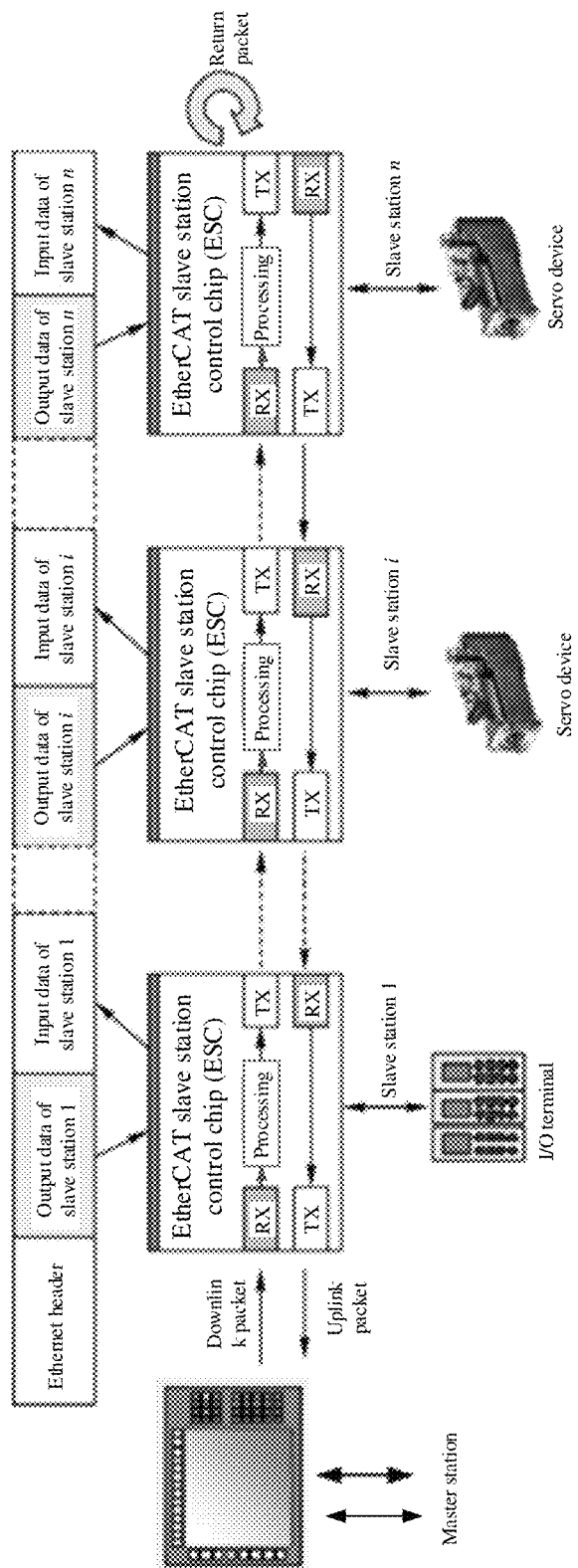
FIG. 1 is a schematic diagram of an EtherCAT-based workflow in the conventional technology.

FIG. 1 is a schematic diagram of an EtherCAT-based workflow in the conventional technology. As shown in FIG. 1, the EtherCAT uses standard Ethernet data frames and a physical layer that complies with the Ethernet standard IEEE 802.3. A master station sends a packet, and the packet passes through all slave stations sequentially. Each slave station searches for corresponding data from the packet sent by the master station, writes data to be exchanged into the packet, and then continues to transmit the packet to a next slave station. When a last slave station in a network segment or branch detects an open port (no next slave station), the packet may be returned to the master station along an original transmission path by using a full-duplex feature of an Ethernet technology. The master station is the only node that can actively send a packet in the network segment, and the slave station is only responsible for packet transmission.

If a quantity of slave stations is excessively large, using this serial transmission mode causes a relatively long transmission delay. In addition, each slave station can write to-be-reported data only when the slave station receives the packet. Therefore, a response speed is low.

Therefore, this application provides a passive optical network (PON) system, to replace an original EtherCAT bus, implement parallel transmission between a master station and slave stations, and reduce a transmission delay. In addition, a slave station can actively report data to the master station. Therefore, an overall response speed of all slave stations is increased.

Figure 2:
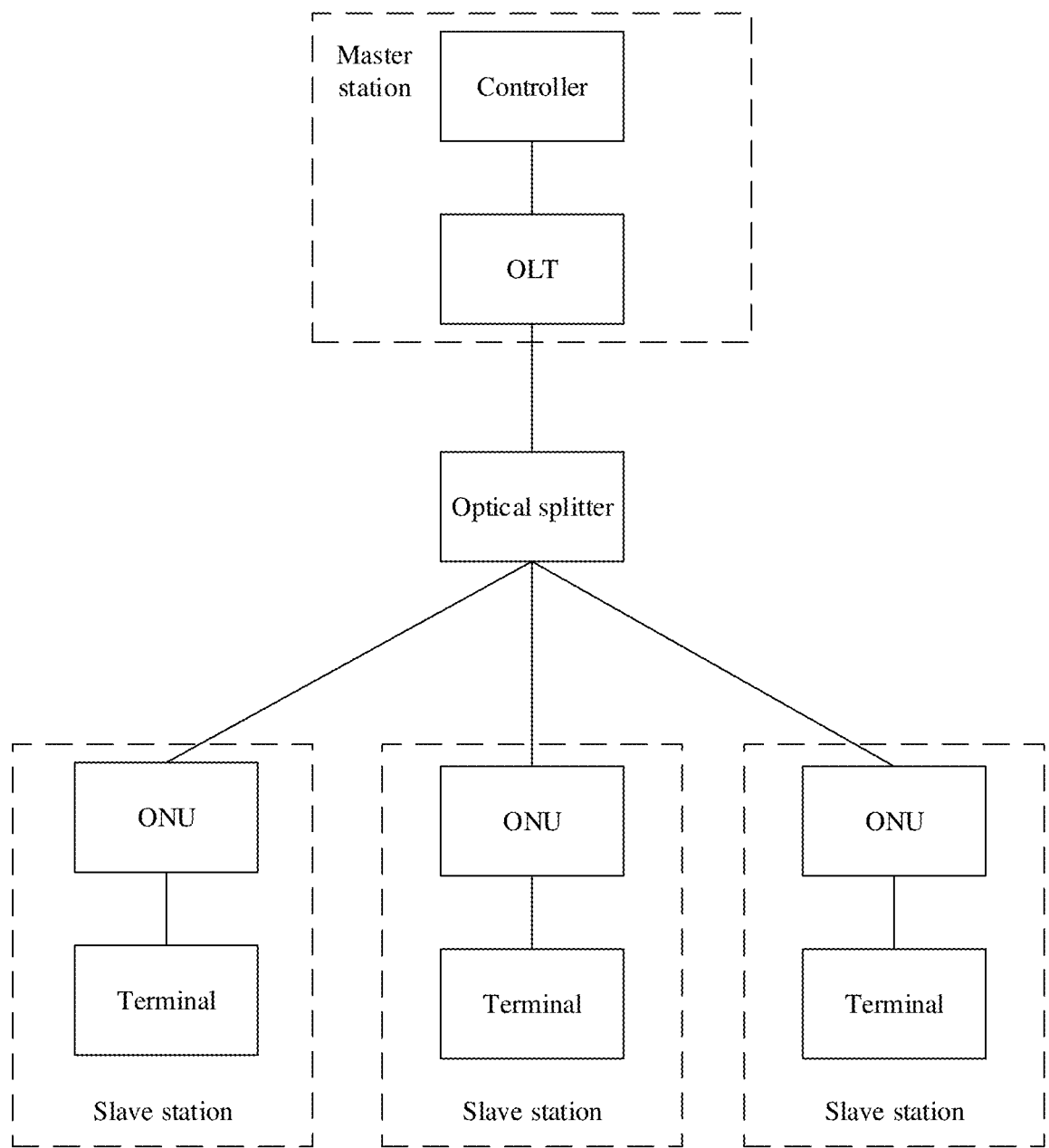
FIG. 2 is a PON system applied to an industrial bus according to an embodiment of this application.

FIG. 2 is a PON system applied to an industrial bus according to an embodiment of this application. As shown in FIG. 2, a difference from an existing industrial bus lies in that an optical line terminal (OLT) is configured at a location of a master station, and an optical network unit (ONU) is configured at a location of a slave station. The OLT, the ONU, and an optical splitter can form the PON system. Specifically, the master station includes a controller for controlling a terminal in the slave station. The controller in the master station may be a programmable logic controller (PLC), a security monitoring controller, a production management controller, or the like. The terminal in the slave station may be a servo motor, a solenoid valve, a sensor, or the like. During transmission of downlink data, the controller sends the downlink data to the OLT. Then the optical splitter separately transmits the downlink data to each ONU, and the ONU selectively receives downlink data carrying an identity of the ONU, and sends the downlink data to a corresponding terminal. The corresponding terminal generally refers to a terminal connected to the ONU in a downlink direction. During transmission of uplink data, the terminal sends the uplink data to the ONU. The optical splitter combines uplink data sent by each ONU into one signal and transmits the signal to the OLT. Then the OLT sends the uplink data to the controller.

It should be understood that, in an actual application, a PON system at another layer is further disposed above the PON system shown in FIG. 2. The upper-layer PON system also has an OLT and an ONU. For example, herein the upper-layer PON system is referred to as a factory-layer PON system, and the lower-layer PON system shown in FIG. 2 is referred to as an equipment-layer PON system. Specifically, the master station shown in FIG. 2 may be used as an OLT of the equipment-layer PON system, or may be used as an ONU of the factory-layer PON system. In other words, the master station provided in this application may play a role of connecting the factory-layer PON system and the equipment-layer PON system.

It should be noted that the PON system provided in this application is not limited to an industrial application scenario. The PON system is applicable to any scenario that complies with the system architecture shown in FIG. 2. This is not specifically limited herein.

With reference to the foregoing PON system, the following describes the data transmission method provided in this application. It should be noted that there may be one or more ONUs in the PON system in this application. Considering that in an actual application, data interaction is usually performed between the OLT and a plurality of ONUs, a scenario in which a plurality of ONUs exist is mainly used as an example for description in the following embodiment.

Figure 3:
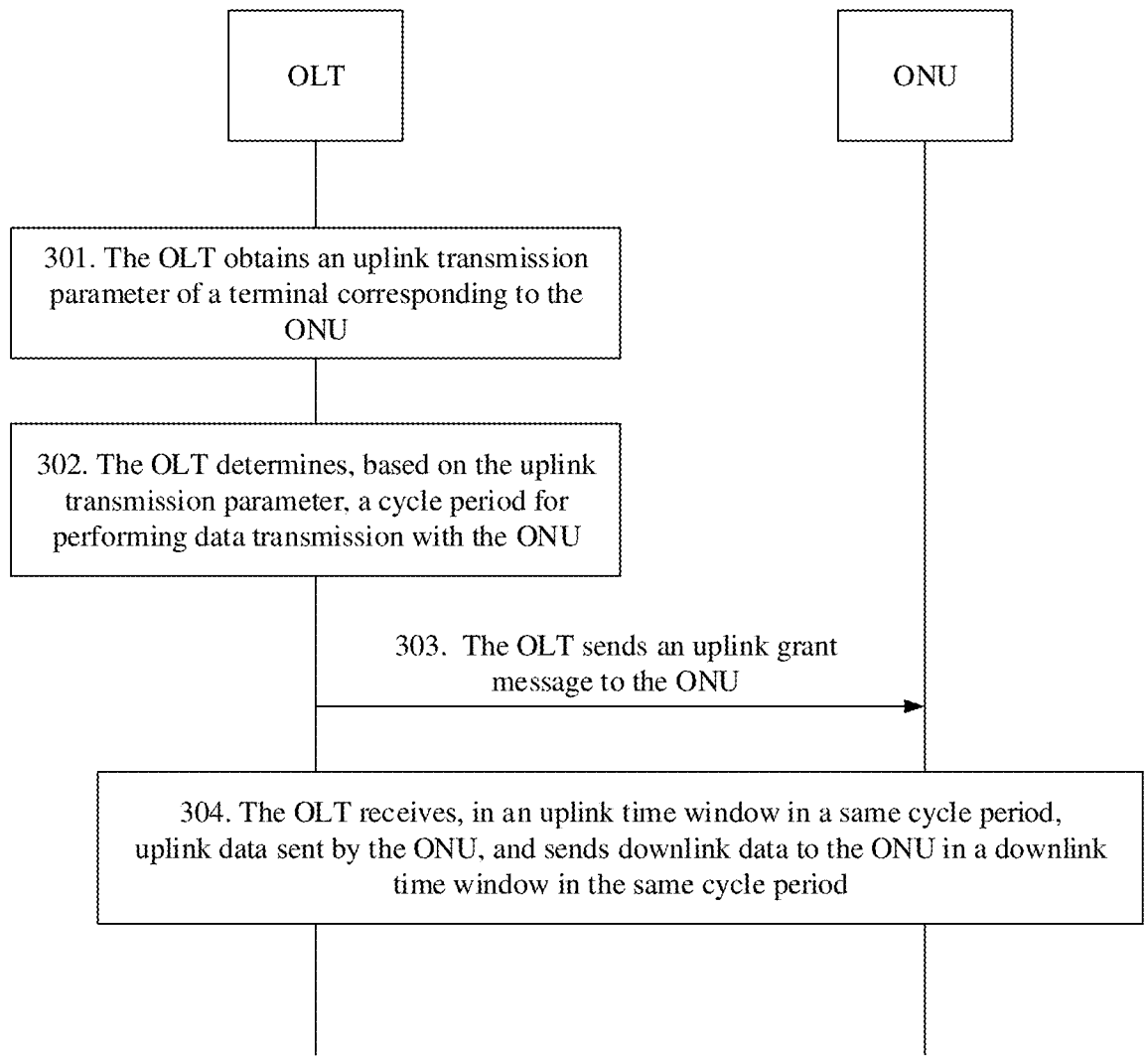
FIG. 3 is a schematic diagram of an embodiment of a data transmission method according to an embodiment of this application.

FIG. 3 is a schematic diagram of an embodiment of a data transmission method according to an embodiment of this application. In an example, the data transmission method includes the following steps.

301. An OLT obtains an uplink transmission parameter of a terminal corresponding to an ONU.

Referring to FIG. 2, each ONU has a terminal corresponding to the ONU, and the OLT may obtain an uplink transmission parameter of each terminal. The uplink transmission parameter of the terminal includes an amount of data that needs to be sent by the terminal each time and a period for sending data by the terminal. It should be understood that the uplink transmission parameter may further include another parameter such as a data type of the data to be sent by the terminal. This is not specifically limited herein.

302. The OLT determines, based on the uplink transmission parameter, a cycle period for performing data transmission with the ONU.

In this embodiment, to keep terminals working synchronously, a cycle period needs to be determined, so that each process in a system is repeatedly performed in the cycle period. Specifically, the OLT determines the cycle period based on the uplink transmission parameter of each terminal. For example, from periods for sending data by the terminals, the OLT may select a shortest period as the cycle period of the system. It should be understood that specific duration of the cycle period is not limited in this application. For example, the cycle period may be 31.25 µs. Each cycle period includes an uplink time window and a downlink time window. The downlink time window is used by the OLT to send downlink data to the ONU. The uplink time window includes an uplink transmission timeslot used by each ONU to send uplink data, and different ONUs have different uplink transmission timeslots in each cycle period. For example, the OLT may allocate, based on the amount of data to be sent by each terminal each time, an uplink transmission timeslot to an ONU corresponding to each terminal.

303. The OLT sends an uplink grant message to the ONU.

In this embodiment, the OLT may send an uplink grant message to each ONU in broadcast mode, and the ONUs may determine their uplink transmission timeslots in the cycle period based on the uplink grant message. In a conventional implementation, an OLT may send an uplink grant message to an ONU each time before the ONU sends uplink data, where the uplink grant message includes a bandwidth map (BWmap). The BWmap includes one or more grant message structures (allocation structures), and each ONU can know its uplink transmission timeslot by identifying a grant message structure corresponding to the ONU.

In addition, this application further provides another possible implementation. Specifically, the OLT may send an uplink grant message to the ONU at a stage of ONU activation registration, where the uplink grant message may be a physical layer operations, administration and maintenance (PLOAM) message or an optical network terminal management and control interface (OMCI) message. For example, some fields are reserved in an original structure of the PLOAM message or the OMCI message to indicate an uplink transmission timeslot of each ONU in a cycle period. It should be understood that, because data transmission between the OLT and the ONU is repeatedly performed in the cycle period, after the OLT performs uplink grant for each ONU by using the PLOAM message or the OMCI message, each ONU may send uplink data in each cycle period based on a negotiated uplink transmission timeslot. The OLT does not need to send the BWmap to the ONU each time to notify the ONU of the uplink transmission timeslot, thereby reducing overheads for sending the BWmap each time.

304. The OLT receives, in an uplink time window in a same cycle period, uplink data sent by the ONU, and sends downlink data to the ONU in a downlink time window in the same cycle period.

In this embodiment, the OLT sends downlink data to each ONU in broadcast mode. If the PON system provided in this application is applied to an industrial bus, and original serial transmission is replaced with parallel transmission, a transmission delay is reduced. In addition, the ONU may actively send uplink data to the OLT, without strictly complying with a master/slave mode in which downlink transmission is performed first and then uplink transmission is performed, provided that uplink transmission and downlink transmission between the OLT and the ONU are performed in the same cycle period, thereby improving overall work efficiency of the system.

Figure 4:
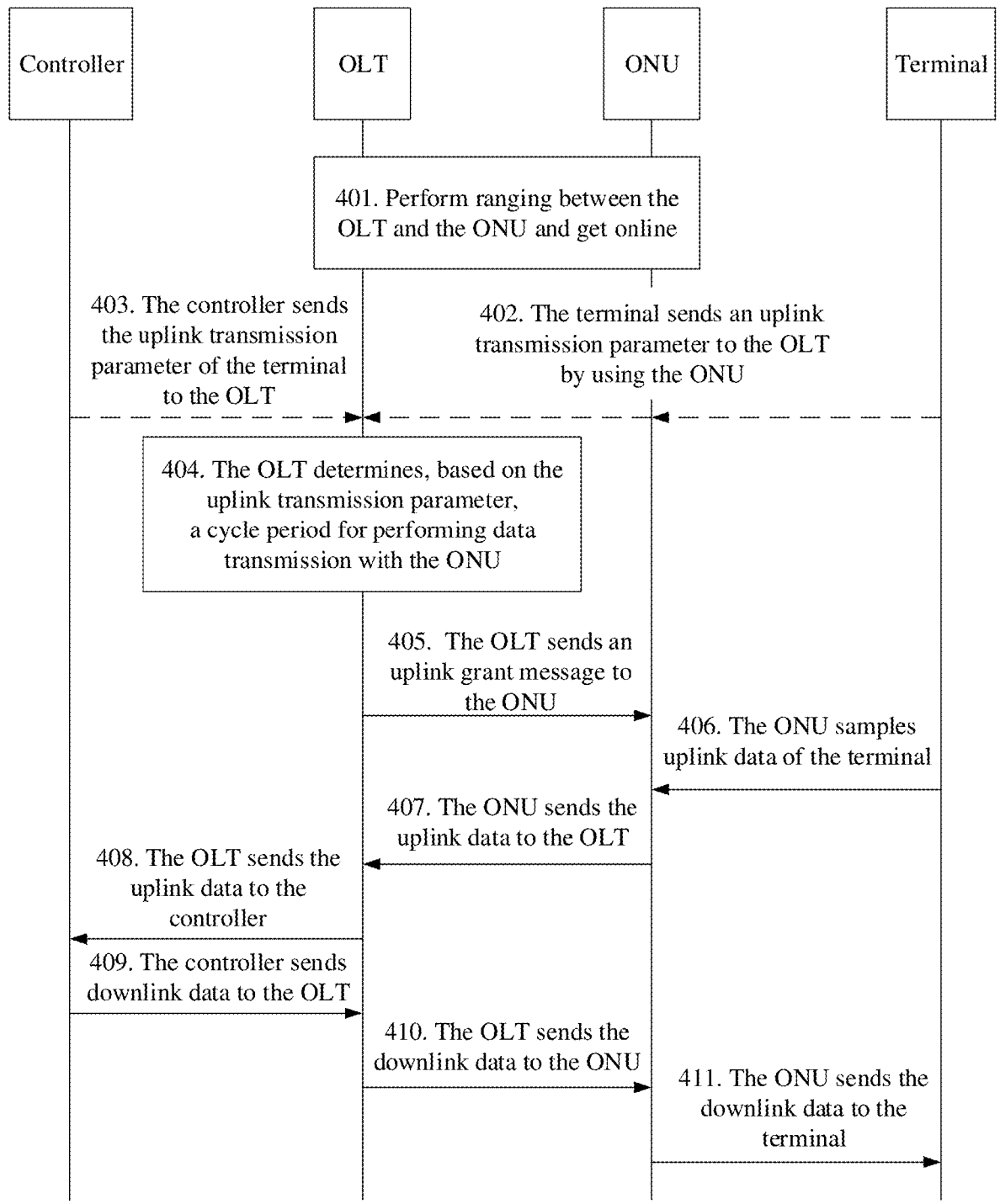
FIG. 4 is a schematic diagram of another embodiment of a data transmission method according to an embodiment of this application.

The following further describes an embodiment in which the PON system shown in FIG. 3 is applied to an industrial bus scenario. FIG. 4 is a schematic diagram of another embodiment of a data transmission method according to an embodiment of this application. In an example, the data transmission method includes the following steps.

401. Perform ranging between an OLT and an ONU and get online.

After each ONU sends a register request to the OLT, the OLT may allocate an identity to each ONU, and measure a length of an optical fiber corresponding to each ONU, to distinguish between ONUs and ensure that no collision occurs in uplink transmission of the ONUs. It should be understood that the step of performing ranging and getting online in this application is consistent with that in the conventional technology. Details are not described herein.

402. A terminal sends an uplink transmission parameter to the OLT by using the ONU.

Optionally, each terminal may send a local uplink transmission parameter to an ONU, and then each ONU sends the uplink transmission parameter to the OLT. For the description of the uplink transmission parameter, refer to step 301 in the embodiment shown in FIG. 3. Details are not described herein again.

403. A controller sends the uplink transmission parameter of the terminal to the OLT.

Optionally, in addition to reporting the local uplink transmission parameter by the terminal, the controller may send the uplink transmission parameter of each terminal to the OLT. It should be understood that there is a master-slave relationship between the controller and the terminal, and the controller controls the terminal. Before delivery, a file in an XML format is configured for both the controller and the terminal. The file includes information such as the uplink transmission parameter of the terminal, vendor information, and serial number. The OLT may obtain the uplink transmission parameter of each terminal by parsing the file in the XML format sent by the controller.

404. The OLT determines, based on the uplink transmission parameter, a cycle period for performing data transmission with the ONU.

Figure 5:
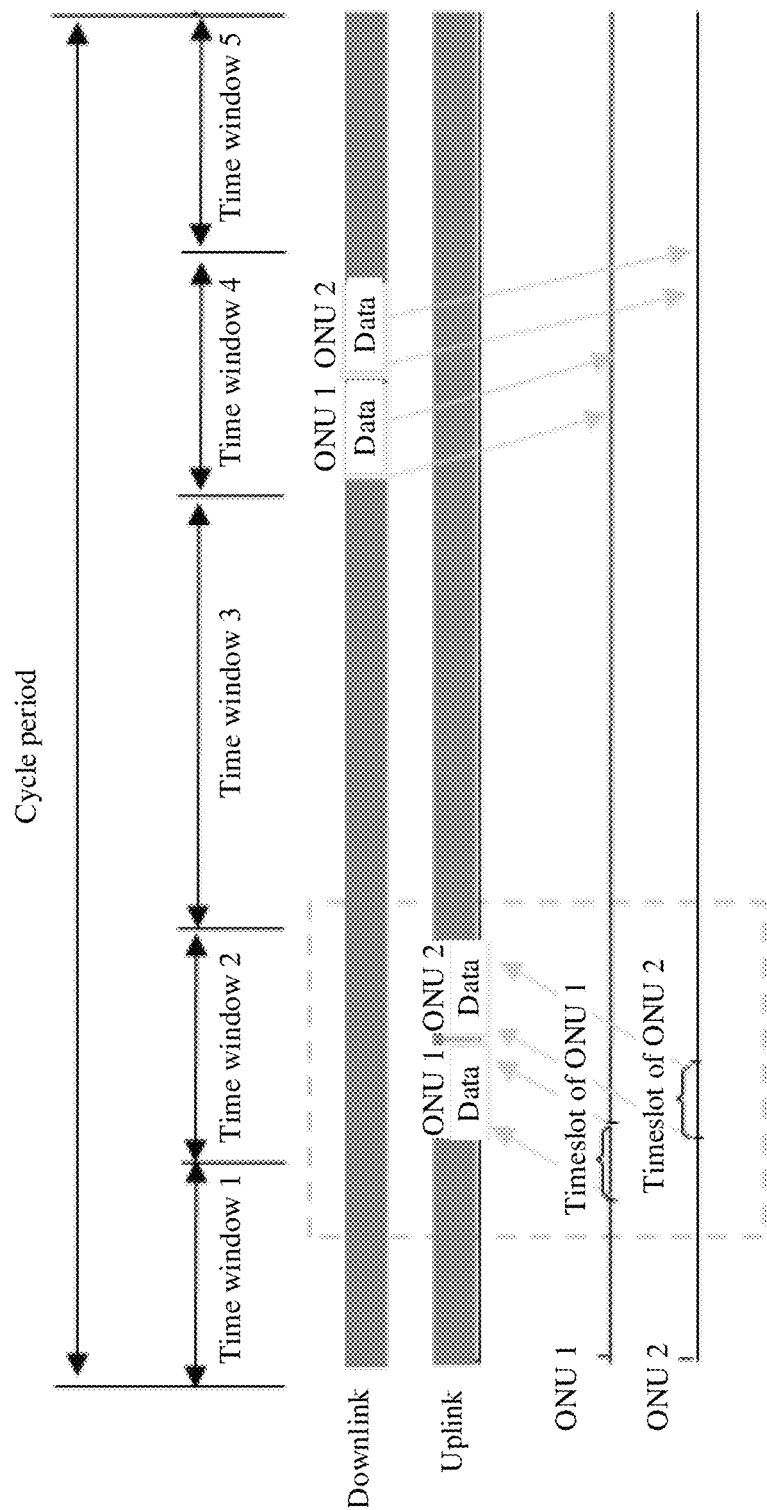
FIG. 5 is a schematic diagram of a cycle period according to an embodiment of this application.

FIG. 5 is a schematic diagram of a cycle period according to an embodiment of this application. As shown in FIG. 5, one cycle period may be divided into five parts: a time window 1 to a time window 5. The time window 1 is used by the ONU to collect uplink data of the terminal. The time window 2 corresponds to the uplink time window in step 302 of the embodiment shown in FIG. 3, and is used by each ONU to send collected uplink data to the OLT. Uplink transmission timeslots of the ONUs in the time window 2 are different. The time window 3 is used by the controller to receive the uplink data sent by the OLT, obtain, through calculation based on the uplink data, downlink data corresponding to each terminal, and then send the downlink data to the OLT. The time window 4 corresponds to the downlink time window in step 302 of the embodiment shown in FIG. 3, and is used by the OLT to broadcast the downlink data to each ONU. The time window 5 is used by each ONU to send the downlink data to the corresponding terminal, and the terminal performs a corresponding operation based on the received downlink data.

It should be understood that this application is different from an existing industrial bus system. The existing industrial bus system uses a serial transmission mode in which a controller needs to send downlink data first and then each terminal returns uplink data to a master station sequentially. In this application, the ONU first actively sends the collected uplink data to the OLT, and the OLT aggregates the uplink data sent by the ONUs and sends the aggregated uplink data to the controller, and then the controller sends the downlink data. In this manner, each ONU may collect uplink data in the time window 1 and actively report the uplink data. In comparison with the existing serial transmission mode, this saves unnecessary waiting time, and improves work efficiency.

405. The OLT sends an uplink grant message to the ONU.

In this embodiment, step 405 is similar to step 303 in the embodiment shown in FIG. 3, and details are not described herein again. 406. The ONU samples the uplink data of the terminal.

Based on the description of step 404, it can be learned that step 406 is completed in the time window 1 shown in FIG. 5. For example, the terminal is a mechanical arm, and the uplink data includes but is not limited to a location, a speed, and the like of the mechanical arm. 407. The ONU sends the uplink data to the OLT.

Based on the description of step 404, it can be learned that step 407 is completed in the time window 2 shown in FIG. 5.

408. The OLT sends the uplink data to the controller.

Based on the description of step 404, it can be learned that step 408 is completed in the time window 3 shown in FIG. 5. In a possible implementation, the OLT may directly forward, to the controller, the uplink data reported by each ONU. In another possible implementation, after extracting the uplink data reported by each ONU, the OLT generates an aggregate data frame, and sends the aggregate data frame to the controller. FIG. 6 is a schematic diagram of a structure of an aggregate data frame according to an embodiment of this application. As shown in FIG. 6, a start field of the aggregate data frame is an Ethernet frame header, an end field of the aggregate data frame is a frame check sequence (FCS), and intermediate fields of the aggregate data frame sequentially include downlink data and uplink data corresponding to each terminal. The OLT inserts the uplink data sent by each ONU into a corresponding uplink data field in the aggregate data frame, and sends the aggregate data frame to the controller.

It should be noted that clock synchronization may be completed between the OLT and the controller in an interrupt manner. Specifically, after collecting the uplink data reported by all the ONUs, the OLT first notifies the controller that the uplink data can be received, and then the controller reads the uplink data from the OLT. 409. The controller sends the downlink data to the OLT.

Based on the description of step 404, it can be learned that step 409 is completed in the time window 3 shown in FIG. 5. The controller calculates, based on the received uplink data, the downlink data corresponding to each terminal, generates an aggregate data frame based on the downlink data, and sends the aggregate data frame to the OLT. Specifically, a structure of the aggregate data frame is consistent with that shown in FIG. 6. The controller inserts the downlink data that needs to be sent into corresponding downlink data fields in the aggregate data frame, and sends the aggregate data frame to the OLT.

410. The OLT sends the downlink data to the ONU.

Based on the description of step 404, it can be learned that step 410 is completed in the time window 4 shown in FIG. 5. It should be understood that the OLT may first convert a frame format of the downlink data sent by the controller into a frame format specified in the PON standard, and then send the downlink data to each ONU by using the frame format specified in the PON standard. The OLT sends a downlink data frame in broadcast mode. After receiving the downlink data frame, each ONU extracts the downlink data required by the ONU.

It should be noted that, in an actual application, the OLT may receive downlink data delivered by different controllers. For example, the OLT may receive downlink data from a PLC, or may receive downlink data from other controllers such as a security monitoring controller or a production management controller. To ensure that a terminal controlled by the PLC can receive data preferentially, the OLT may send the downlink data to the ONUs sequentially based on priorities of the downlink data delivered by the controllers. It should be understood that, if transmission of data with a low priority cannot be completed in a cycle period due to an excessively large data amount, the data with the low priority may be further sliced, and the transmission is continued in a next cycle period.

Figure 7:
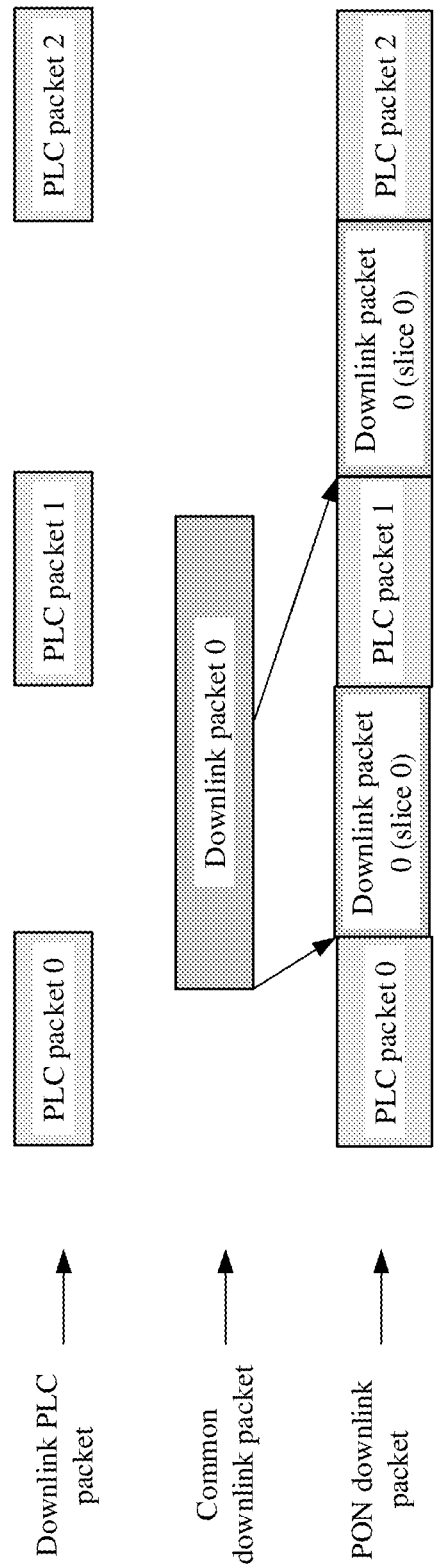
FIG. 7 is a schematic diagram of a time sequence of transmitting downlink data by an OLT.

FIG. 7 is a schematic diagram of a time sequence of transmitting downlink data by the OLT. As shown in FIG. 7, a priority of a PLC packet is higher than that of a common downlink packet. To ensure that the PLC packet is preferentially sent in a downlink time window in each cycle period, first, a PLC packet 0 is sent in a downlink time window in a first cycle period, and then a downlink packet 0 is sent after transmission of the PLC packet 0 is completed. However, because the downlink packet 0 cannot be completely transmitted in the first cycle period, the downlink packet 0 needs to be sliced. First, a first part of the sliced downlink packet 0 is transmitted in the first cycle period, and then, in a time period in which the PLC packet 1 is not transmitted in the second cycle period, a second part of the sliced downlink packet 0 is transmitted. It should be understood that a low-priority common packet is not strictly required to be transmitted in a downlink time window in a cycle period. A low-priority packet may be transmitted in any time period in which no high-priority packet is transmitted in the cycle period.

411. The ONU sends the downlink data to the terminal.

Based on the description of step 404, it can be learned that step 411 is completed in the time window 5 shown in FIG. 5. After receiving the downlink data, each terminal may perform corresponding operations synchronously.

In this embodiment of this application, the OLT determines the cycle period based on the uplink transmission parameter of the terminal corresponding to each ONU, and data transmission between the OLT and each ONU is repeatedly performed in the cycle period. Each ONU may know the uplink transmission timeslot of the ONU in each cycle period based on the uplink grant message sent by the OLT, and the OLT does not need to send a BWmap to the ONU each time to notify the ONU of the uplink transmission timeslot. Therefore, overheads for sending the BWmap each time are reduced. In addition, the OLT sends downlink data to each ONU in broadcast mode. If the PON system provided in this application is applied to an industrial bus, and original serial transmission is replaced with parallel transmission, a transmission delay is reduced. In addition, the ONU may actively send the uplink data to the OLT, without strictly complying with a master/slave mode in which downlink transmission is performed first and then uplink transmission is performed, provided that uplink transmission and downlink transmission between the OLT and the ONU are performed in the same cycle period, thereby improving overall work efficiency of the system.

The foregoing describes the data transmission method in embodiments of this application. The following describes an OLT and an ONU in embodiments of this application.

Figure 8:
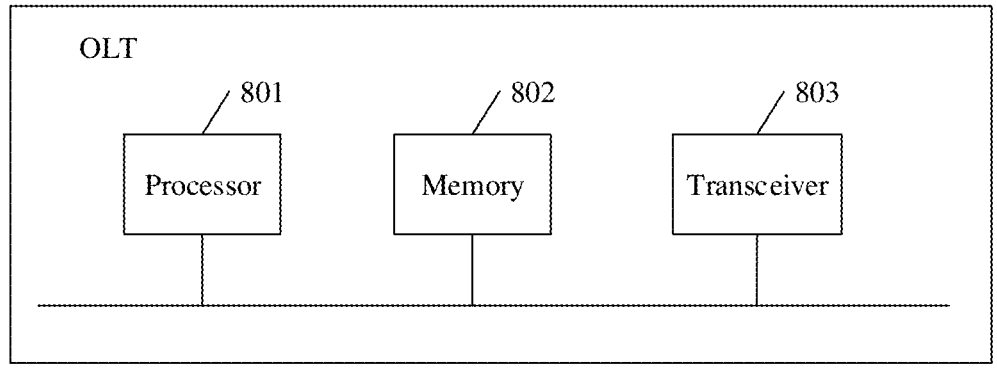
FIG. 8 is a schematic diagram of a possible structure of an OLT.

FIG. 8 is a schematic diagram of a possible structure of an OLT. The OLT includes a processor 801, a memory 802, and a transceiver 803. The processor 801, the memory 802, and the transceiver 803 are connected to each other by using a bus. The memory 802 is configured to store program instructions and data. The transceiver 803 includes a transmitter and a receiver. It should be noted that the OLT may be an OLT that implements the data transmission method in the embodiment shown in FIG. 3 or FIG. 4.

In a possible implementation, the memory 802 stores program instructions and data that support the steps in the embodiment shown in FIG. 3 or FIG. 4, and the processor 801 and the transceiver 803 are configured to perform the method steps in the embodiment shown in FIG. 3 or FIG. 4. Specifically, the transceiver 803 is configured to perform data sending and receiving operations, and the processor 801 is configured to perform other operations than data receiving and sending.

Figure 9:
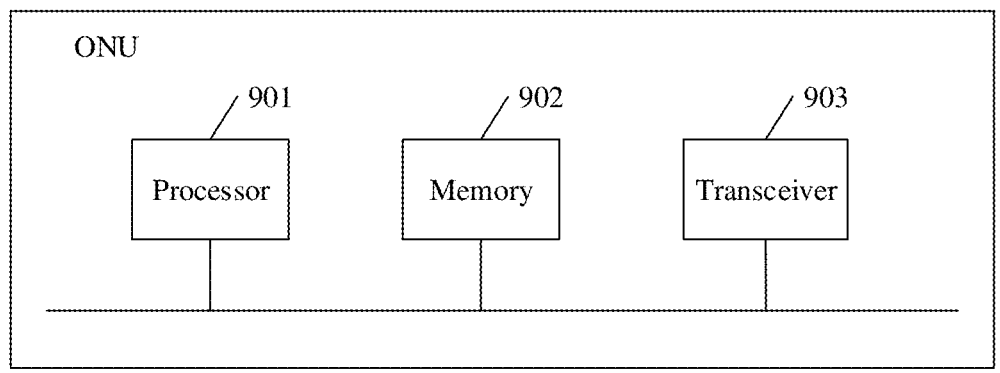
FIG. 9 is a schematic diagram of a possible structure of an ONU.

FIG. 9 is a schematic diagram of a possible structure of an ONU. The ONU includes a processor 901, a memory 902, and a transceiver 903. The processor 901, the memory 902, and the transceiver 903 are connected to each other by using a bus. The memory 902 is configured to store program instructions and data. The transceiver 903 includes a transmitter and a receiver. It should be noted that the ONU may be an ONU that implements the data transmission method in the embodiment shown in FIG. 3 or FIG. 4.

In a possible implementation, the memory 902 stores program instructions and data that support the steps in the embodiment shown in FIG. 3 or FIG. 4, and the processor 901 and the transceiver 903 are configured to perform the method steps in the embodiment shown in FIG. 3 or FIG. 4. Specifically, the transceiver 903 is configured to perform data sending and receiving operations, and the processor 901 is configured to perform other operations than data receiving and sending.

It should be noted that the processor shown in FIG. 8 and FIG. 9 may use a general-purpose central processing unit (CPU), a microprocessor, an application-specific integrated circuit ASIC, or at least one integrated circuit, and is configured to execute a related program to implement the technical solutions provided in embodiments of this application. The memory shown in FIG. 8 and FIG. 9 may store an operating system and another application program. When the technical solutions provided in embodiments of this application are implemented by using software or firmware, program code used to implement the technical solutions provided in embodiments of this application is stored in the memory, and is executed by the processor. In an embodiment, a memory may be included in the processor. In another embodiment, the processor and the memory are two separate structures.

Figure 10:
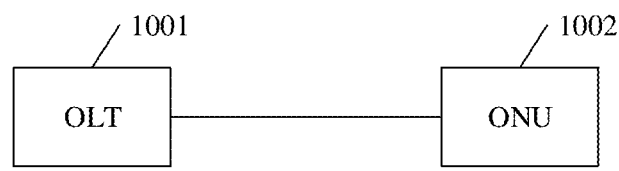
FIG. 10 is a schematic diagram of a structure of a passive optical network according to this application.

FIG. 10 is a schematic diagram of a structure of a passive optical network according to this application. The passive optical network includes an OLT (1001) and an ONU (1002). The OLT (1001) is configured to perform some or all steps of any method performed by the OLT in the embodiment shown in FIG. 3 or FIG. 4. The ONU (1002) is configured to perform some or all steps of any method performed by the ONU in the embodiment shown in FIG. 3 or FIG. 4.

Figure 11:
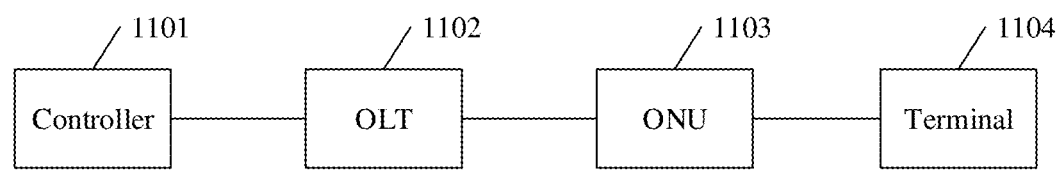
FIG. 11 is a schematic diagram of a structure of a data transmission system according to this application.

FIG. 11 is a schematic diagram of a structure of a data transmission system according to this application. The data transmission system includes a controller 1101, an OLT (1102), an ONU (1103), and a terminal 1104. The controller 1101 is configured to perform some or all steps of any method performed by the controller in the embodiment shown in FIG. 4. The OLT (1102) is configured to perform some or all steps of any method performed by the OLT in the embodiment shown in FIG. 4. The ONU (1103) is configured to perform some or all steps of any method performed by the ONU in the embodiment shown in FIG. 4. The terminal 1104 is configured to perform some or all steps of any method performed by the terminal in the embodiment shown in FIG. 4.

A person skilled in the art may clearly understand that, for the purpose of convenient and brief description, for detailed working processes of the foregoing system, apparatuses, and units, refer to corresponding processes in the foregoing method embodiments. Details are not described herein again.

A person of ordinary skill in the art may understand that all or some of the steps of embodiments may be implemented by hardware or a program instructing related hardware. The program may be stored in a computer-readable storage medium. The storage medium may include a read-only memory, a random access memory, or the like. Specifically, for example, the foregoing processing unit or processor may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

When software is used to implement embodiments, the method steps in the foregoing embodiments may be implemented completely or partially in a form of a computer program product. The computer program product includes one or more computer instructions. When the computer program instructions are loaded and executed on a computer, all or some of the procedures or the functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State drive (SSD)), or the like.

Finally, it should be noted that, the foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   obtaining, by an optical line terminal (OLT), a first uplink transmission parameter of a first terminal corresponding to a first optical network unit (ONU), wherein the first uplink transmission parameter comprises an amount of data to be sent by the first terminal each time and a period for sending data by the first terminal;
   determining, by the OLT, based on the first uplink transmission parameter, a cycle period for performing data transmission with the first ONU, wherein the cycle period comprises an uplink time window and a downlink time window, the uplink time window comprises a first uplink transmission timeslot used by the first ONU to send uplink data, and the downlink time window is used by the OLT to send downlink data;
   sending, by the OLT, an uplink grant message to the first ONU, wherein the uplink grant message indicates the cycle period and the first uplink transmission timeslot of the first ONU in the cycle period; and
   after the sending the uplink grant message:
      receiving, by the OLT, in the first uplink transmission timeslot of the uplink time window in the cycle period, first uplink data sent by the first ONU; and
      sending, by the OLT, first downlink data to the first ONU in the downlink time window in the cycle period.

2. The method according to claim 1, wherein the method further comprises:
   obtaining, by the OLT, a second uplink transmission parameter of a second terminal corresponding to a second ONU, wherein the second uplink transmission parameter comprises an amount of data to be sent by the second terminal each time and a period for sending data by the second terminal;
   wherein the determining, by the OLT based on the first uplink transmission parameter, the cycle period for performing data transmission with the first ONU comprises:
      determining, by the OLT, based on the first uplink transmission parameter and the second uplink transmission parameter, a cycle period for performing data transmission with the first ONU and the second ONU, wherein the uplink time window further comprises a second uplink transmission timeslot used by the second ONU to send uplink data; and wherein the method further comprises:
sending, by the OLT, a second uplink grant message to the second ONU, wherein the second uplink grant message indicates the second uplink transmission timeslot of the second ONU in each cycle period;
receiving, by the OLT, in the second uplink transmission timeslot in the cycle period, second uplink data sent by the second ONU; and
sending, by the OLT, second downlink data to the second ONU in the downlink time window in the cycle period.

3. The method according to claim 2, wherein each cycle period further comprises a first time window, the first time window in each cycle period is located between the uplink time window and the downlink time window, and the method further comprises:
sending, by the OLT, the first uplink data and the second uplink data to a first controller in the first time window in the cycle period; and
receiving, in the first time window in the cycle period, the first downlink data and the second downlink data sent by the first controller,
wherein the first controller is configured to control the first terminal and the second terminal, the first uplink data comes from the first terminal, and the second uplink data comes from the second terminal.

4. The method according to claim 3, wherein the sending, by the OLT, the first uplink data and the second uplink data to the first controller in the first time window in the cycle period comprises:
generating, by the OLT, an uplink aggregate data frame, wherein the uplink aggregate data frame comprises the first uplink data and the second uplink data; and
sending, by the OLT, the uplink aggregate data frame to the first controller in the first time window in the cycle period.

5. The method according to claim 3, wherein the receiving, by the OLT in the first time window in the cycle period, the first downlink data and the second downlink data sent by the first controller comprises:
receiving, by the OLT in the first time window in the cycle period, a downlink aggregate data frame sent by the first controller, wherein the downlink aggregate data frame comprises the first downlink data and the second downlink data.

6. The method according to claim 3, wherein the obtaining, by the OLT, the first uplink transmission parameter of the first terminal corresponding to the first ONU comprises:
receiving, by the OLT, using the first ONU, the first uplink transmission parameter sent by the first terminal; or
receiving, by the OLT, the first uplink transmission parameter sent by the first controller.

7. The method according to claim 3, wherein the uplink grant message is a physical layer operations, administration and maintenance (PLOAM) message or an optical network terminal management and control interface (OMCI) message, and the first controller is a programmable logic controller (PLC).

8. The method according to claim 1, wherein the uplink time window in each cycle period is located before the downlink time window.

9. The method according to claim 1, wherein the method further comprises:
receiving, by the OLT, in the cycle period, third downlink data sent by a controller, wherein priorities of the first downlink data and second downlink data are higher than a priority of the third downlink data; and
sending, by the OLT, after the sending, by the OLT, the first downlink data to the first ONU in the downlink time window in the cycle period, and after the sending the second downlink data to a second ONU in the downlink time window in the cycle period, the third downlink data to a third ONU in the cycle period.

10. The method according to claim 1, wherein the cycle period further comprises a second time window and a third time window, the second time window is used by the first terminal to obtain the first uplink data, the third time window is used by the first ONU to send the first downlink data to the first terminal, and the second time window in each cycle period is located before the third time window.

11. An optical line terminal (OLT), comprising:
a processor, a non-transitory memory, and an optical transceiver, wherein the processor, the non-transitory memory, and the optical transceiver are connected to each other by using a bus, and wherein the non-transitory memory stores a program to be executed by the processor, the program including instructions to cause the OLT to perform operations including:
obtaining a first uplink transmission parameter of a first terminal corresponding to a first optical network unit (ONU), wherein the first uplink transmission parameter comprises an amount of data to be sent by the first terminal each time and a period for sending data by the first terminal;
determining based on the first uplink transmission parameter, a cycle period for performing data transmission with the first ONU, wherein the cycle period comprises an uplink time window and a downlink time window, the uplink time window comprises a first uplink transmission timeslot used by the first ONU to send uplink data, and the downlink time window is used by the OLT to send downlink data;
sending an uplink grant message to the first ONU, wherein the uplink grant message indicates the cycle period and the first uplink transmission timeslot of the first ONU in the cycle period; and
after the sending the uplink grant message:
receiving in the first uplink transmission timeslot of the uplink time window in the cycle period, first uplink data sent by the first ONU; and
sending first downlink data to the first ONU in the downlink time window in the cycle period.

12. A non-transitory computer-readable storage medium, wherein the non-transitory computer-readable storage medium stores a program to be executed by a processor in an optical line terminal (OLT), the program including instructions to cause the OLT to perform operations including:
obtaining a first uplink transmission parameter of a first terminal corresponding to a first optical network unit (ONU), wherein the first uplink transmission parameter comprises an amount of data to be sent by the first terminal each time and a period for sending data by the first terminal;
determining based on the first uplink transmission parameter, a cycle period for performing data transmission with the first ONU, wherein the cycle period comprises an uplink time window and a downlink time window, the uplink time window comprises a first uplink transmission timeslot used by the first ONU to send uplink data, and the downlink time window is used by the OLT to send downlink data;
sending an uplink grant message to the first ONU, wherein the uplink grant message indicates the cycle period and the first uplink transmission timeslot of the first ONU in the cycle period; and after the sending the uplink grant message:
receiving in the first uplink transmission timeslot of the uplink time window in the cycle period, first uplink data sent by the first ONU; and
sending first downlink data to the first ONU in the downlink time window in the cycle period.

13. A method, comprising:
receiving, by an optical network unit (ONU), an uplink grant message sent by an optical line terminal (OLT), wherein the uplink grant message indicates a cycle period and an uplink transmission timeslot; and
after the receiving the uplink grant message:
determining, by the ONU, based on the uplink grant message, the cycle period for performing data transmission with the OLT and the uplink transmission timeslot in the cycle period, wherein the cycle period comprises an uplink time window and a downlink time window, the uplink time window comprises the uplink transmission timeslot used by the ONU to send uplink data, and the downlink time window is used by the OLT to send downlink data;
sending, by the ONU, first uplink data to the OLT in the uplink transmission timeslot of the uplink time window in the cycle period; and
receiving, by the ONU, in the downlink time window in the cycle period, first downlink data sent by the OLT.

14. The method according to claim 13, wherein the uplink time window in each cycle period is located before the downlink time window.

15. The method according to claim 13, wherein the method further comprises, before the sending, by the ONU, the first uplink data to the OLT in the uplink transmission timeslot in the cycle period:
receiving, by the ONU in the cycle period, the first uplink data sent by a terminal.

16. The method according to claim 15, wherein the first downlink data is sent by a controller to the OLT, the controller is configured to control the terminal, and the method further comprises, after the receiving, by the ONU in the downlink time window in the cycle period, the first downlink data sent by the OLT:
sending, by the ONU, the first downlink data to the terminal in the cycle period.

17. The method according to claim 13, wherein the method further comprises, before the receiving, by the ONU, the uplink grant message sent by the OLT:
receiving, by the ONU, an uplink transmission parameter sent by a terminal, and sending the uplink transmission parameter to the OLT, wherein the cycle period is determined by the OLT based on the uplink transmission parameter, and the uplink transmission parameter comprises an amount of data to be sent by the terminal each time and a period for sending data by the terminal.

18. An optical network unit (ONU), comprising:
a processor, a non-transitory memory, and an optical transceiver, wherein the processor, the non-transitory memory, and the optical transceiver are connected to each other by a bus, and wherein the non-transitory memory stores a program to be executed by the processor, the program including instructions to cause the ONU to perform operations including:
receiving an uplink grant message sent by an optical line terminal (OLT), wherein the uplink grant message indicates a cycle period and an uplink transmission timeslot; and
after the receiving the uplink grant message:
determining based on the uplink grant message, the cycle period for performing data transmission with the OLT and the uplink transmission timeslot in the cycle period, wherein the cycle period comprises an uplink time window and a downlink time window, the uplink time window comprises the uplink transmission timeslot used by the ONU to send uplink data, and the downlink time window is used by the OLT to send downlink data;
sending first uplink data to the OLT in the uplink transmission timeslot of the uplink time window in the cycle period; and
receiving in the downlink time window in the cycle period, first downlink data sent by the OLT.

19. A non-transitory computer-readable storage medium, wherein the non-transitory computer-readable storage medium stores a program to be executed by an optical network unit (ONU), the program including instructions to cause the ONU to perform operations including:
receiving an uplink grant message sent by an optical line terminal (OLT), wherein the uplink grant message indicates a cycle period and an uplink transmission timeslot; and
after the receiving the uplink grant message:
determining based on the uplink grant message, the cycle period for performing data transmission with the OLT and the uplink transmission timeslot in the cycle period, wherein the cycle period comprises an uplink time window and a downlink time window, the uplink time window comprises the uplink transmission timeslot used by the ONU to send uplink data, and the downlink time window is used by the OLT to send downlink data;
sending first uplink data to the OLT in the uplink transmission timeslot of the uplink time window in the cycle period; and
receiving in the downlink time window in the cycle period, first downlink data sent by the OLT.

20. A data transmission system, comprising a controller, an optical line terminal (OLT), an optical network unit (ONU), and a terminal, wherein:
the OLT is configured to:
obtain an uplink transmission parameter of the terminal corresponding to the ONU;
determine, based on the uplink transmission parameter, a cycle period for performing data transmission with the ONU; and
send an uplink grant message to the ONU, wherein the cycle period comprises an uplink time window and a downlink time window, the uplink time window comprises an uplink transmission timeslot used by the ONU to send uplink data, the downlink time window is used by the OLT to send downlink data, and the uplink grant message indicates the cycle period and the uplink transmission timeslot of the ONU in the cycle period;
the ONU is configured to:
after receiving the uplink grant message:
receive, in the cycle period, first uplink data sent by the terminal; and
send the first uplink data to the OLT in the cycle period;
the OLT is further configured to:

after sending the uplink grant message:
  receive, in the cycle period, first downlink data sent by the controller; and
  send the first downlink data to the ONU in the cycle period; and
the ONU is further configured to:
  send the first downlink data to the terminal in the cycle period.

\* \* \* \* \*